United States Patent Office 2,819,177
Patented Jan. 7, 1958

2,819,177

STABLE COLLOIDAL TITANIA MONOHYDRATE DISPERSIONS

Robert C. Conn and Richard D. Vartanian, Bound Brook, N. J., assignors to American Cyanamid Company, New York, N. Y., a corporation of Maine No Drawing. Application February 9, 1956
Serial No. 564,581

8 Claims. (Cl. 106—308)

The present invention relates to a process for preparing an aqueous colloidal dispersion of colorless, negatively charged titanium oxide monohydrate, the dispersion itself, the method of treating surfaces with said dispersion, to improve their resistance to soil and to impart properties thereto, and the surfaces which have been so treated. In particular, the present invention relates to such a dispersion useful in the treatment of textiles including fibers, yarns, and fabrics, both flat and pile, for the purpose of imparting durable soil resistance thereto.

An object of the present invention is to provide a negatively charged aqueous dispersion of hydrous titania wherein the titania has an average particle size of less than about 0.1 micron.

A further object is to provide such a dispersion which when applied to textile fibers, yarns, fabrics and the like in effective amounts to impart soil resistance thereto will not significantly whiten the fabric. It is a further object to provide such a composition which when so applied is durable and does not appreciably increase the harshness of the hand of the material to which it is applied.

These and other objects and advantages will become apparent as the present invention is set forth more fully herein below.

According to the present invention, a negatively charged aqueous dispersion of colloidal titania monohydrate is prepared by first acidifying a substantially sulfate ion-free aqueous suspension of titania hydrate to a pH below about 5. This produces a liquid having a milky appearance. For this purpose, mono-basic inorganic acids such as hydrochloric, hydroiodic, hydrobromic, hydrofluoric, nitric, and the like, including mixtures thereof may be employed.

The sulfate ion-free aqueous suspension of titania hydrate employed as a starting material in the present process is preferably obtained from the third Moore filter cake. It is titania monohydrate which has been derived from titanium ore which has been digested in sulfuric acid, hydrolyzed, filtered, washed, reslurried and washed again in a conventional Moore filter until the so-called third Moore filter cake is derived. This cake is then reslurried and neutralized to a pH of between 7 and 8, and preferably to between 7 and 7.2. The neutralized slurry is then filtered and washed with water so as to remove substantially all sulfate ions from the filter cake.

The pH of the above-described milky liquid is then adjusted to a value greater than 5 and preferably to a value between 5 and 11. Optimum results have been achieved when the pH of the dispersion is of a value between 6.5 and 9.

The materials used to adjust the pH into the range set forth above are as critical to the present inventive concept as is the range itself. These materials comprise a mixture of an acid selected from the group consisting of water soluble aliphatic acids and water-soluble polybasic inorganic acids used in conjunction with alkali metal hydroxides, phosphates, borates and carbonates. Among the acids suited for use are citric, tartaric, lactic, acetic, oxalic, glycolic, gluconic, phosphoric, orthophosphoric, sulfuric, sulfurous, and the like. Obviously, these acids and similarly functioning acids may be used either singly or in combination with each other.

When the finished titanium hydrous oxide dispersion has a pH of between 5 and 6.5 it is generally preferred that it contain at least about 1% by weight of water soluble aliphatic acids, or water-soluble polybasic inorganic acids or mixtures thereof. As the pH value increases, as for example when the finished dispersion has a pH of 8.5 and above, as little as 0.25% by weight of acid is sufficient. Below these percentages dispersions of more limited utility result. The amount of acid may be increased up to 5% and even higher at either end of the operable pH range, however, since amounts of acid in excess of 5% increase of the volume of the system, and do not appreciably improve the product, such amounts are not usually employed.

Among the alkali metal hydroxides, carbonates, phosphates, and borates which are suited for use are sodium hydroxide, potassium hydroxide, sodium carbonate, potassium carbonate, sodium borate, potassium borate, and various phosphates, as for example trisodium phosphate. In raising the pH of the initial acidic colloidal dispersion of titania monohydrate above 5, the alkali metal compound must, of course, be present in stoichiometric excess relative to the aliphatic or polybasic inorganic acid as is illustrated in the detailed examples hereinbelow. Moreover, the alkali metal compound should be added either along with or subsequent to the addition of the second acid.

In order that the present invention may be more fully understood, the following examples are set forth primarily for the purpose of illustration. No details set forth therein should be construed as limitations except as they appear in the appended claims. All parts and percentages are by weight unless otherwise specifically designated.

EXAMPLE 1

Part A

In a suitable container 3000 parts of a titania monohydrate slurry (third Moore filter cake with water as above identified) containing the equivalent of 900 parts of calcined titanium dioxide was diluted with 1500 parts of water and stirred until smooth. A solution containing 127 parts of $Na_2CO_3$ and 506 parts of water was added to the $TiO_2$ dispersion with stirring to give a titanium dioxide dispersion having a pH of 7.

This dispersion was filtered on a Büchner funnel and washed with water until the filter cake was substantially free of sulfate ions. 2202 parts of this filter cake containing 873 parts of $TiO_2$ was diluted with 704 parts of water and stirred until smooth. Into this dispersion 61 parts of concentrated hydrochloric acid (37–38%) were added with stirring which was continued until a colloidal dispersion resulted. The product, an acid colloidal dispersion, had a pH of 1.6 and a calcined titanium dioxide content of 29.4%.

Thereafter, the titanium dioxide content was reduced to 25% by dilution of the colloidal dispersion with the proper volume of water to produce a product which gave an opalescent colloidal suspension on further dilution with water.

Part B

Into a suitable container, 72 parts of the acid colloidal titania monohydrate dispersion prepared under Part A were placed. To this dispersion was added a solution containing 1 part of anhydrous citric acid and 1 part of water followed by a solution containing 2.5 parts of Carbowax 4000 and 2.5 parts of water. To this mixture was added with stirring a warm solution containing 6.3 parts of $Na_3PO_4.12H_2O$ and 14.7 parts of water. The dispersion was stirred until smooth. The resulting product was a thixotropic colloidal dispersion having a pH of 7.2. When a single drop of this dispersion is added to a small quantity of water, as for example between 10 and 50 cc., a opalescent solution containing negatively charged titania hydrate was obtained with a particle size of less than 0.1 micron.

5.8 parts of the finished product was dispersed in 94.2 parts of water, the resultant dispersion thereafter being transferred to a shallow container. A piece of white wool rug was placed face down in the dispersion. This gives a wet pick-up of about 50%, based on the total weight of the rug, which is equivalent to about 100% wet pick-up based on the total weight of the pile. The treated rug was dried at 100° C. in a forced draft oven. The treated piece and an untreated control piece were fastened to two 5" x 5" windows in a revolving drum for the purpose of exposing the treated and control pieces to controlled soiling. Two grams of a synthetic soil was placed in the perforated axle of the drum and 17½-inch steel balls and 18¼-inch steel balls were placed in the drum. The opening was closed and the drum was rotated for 20 minutes. The samples were then removed, vacuum cleaned, and the treated sample was compared with the control in order to evaluate the effectiveness of the treatment for imparting soil resistance. The treated carpet was light gray in color while the untreated carpet appears black.

EXAMPLE 2

Example 1 was repeated with the exception that in Part A, 55 parts of a 70% nitric acid solution was substituted for the 61 parts of concentrated hydrochloric acid. The finished dispersion was then prepared as described in Part B of Example 1, and had a pH of 7.1. When applied to a wool rug as in Example 1 good soil resistance was imparted thereto.

EXAMPLE 3

Example 1 was repeated with the exception that the finished titania monohydrate dispersion containing the trisodium phosphate was given one pass through a Premier colloid mill. The resulting product was a thixotropic dispersion having a pH of 7.2. A white wool rug treated and soiled as in Example 1 showed good soil resistance.

EXAMPLE 4

Example 1 was repeated except that in Part A 105 parts of a 28% solution of ammonium hydroxide was substituted for the sodium carbonate used for neutralizing the titania monohydrate slurry.

The finished dispersion is prepared as described in Part B of example 1. The pH of this dispersion was 7.1. When the dispersion was applied to a wool rug as described in Example 1 the treated rug showed good soil resistance and was not whitened by the treatment.

EXAMPLE 5

Example 4 was repeated with the exception that under Part B of Example 1, 0.2 part of Santobrite, a sodium salt of pentachlor phenol, a mildew proofing agent made by the Monsanto Chemical Company, was added to the solution containing 6.3 parts of trisodium phosphate and 14.7 parts of water. The dispersion was stirred until smooth. The resulting product was a thixotropic colloidal dispersion having a pH of 7.2.

EXAMPLE 6

To 72 parts of an acid colloidal titania monohydrate dispersion prepared as in Example 4 a solution containing 1 part of anhydrous citric acid and 1 part of water was added with stirring. This was followed by the addition with stirring of a solution containing 2.5 parts of Carbowax 4000 and 2.5 parts of water. Thereafter, a solution containing 1.5 parts of $Na_3PO_4.12H_2O$, 1 part of NaOH and 18.5 parts of water was added with stirring. This dispersion was stirred until smooth. The resultant product had a pH of 6.8 and on dilution with water gave an opalescent colloidal dispersion having a particle size of less than 0.1 micron.

The finished product was applied to a wool rug as described in Example 1 and the rug so treated showed good soil resistance and was not whitened by the treatment.

EXAMPLE 7

To 72 parts of an acid colloidal titania monohydrate dispersion prepared as in Example 4 a solution containing 1 part of anhydrous citric acid and 1 part of water were added with stirring. This was followed by the addition with stirring of a solution containing 2.5 parts of Carbowax 4000 and 2.5 parts of water. Thereafter, a warm solution containing 6 parts of borax ($Na_2B_4O_7.10H_2O$) and 15 parts of water was added with stirring. Stirring was continued until the product was smooth. The resultant product had a pH of 7.0 and on dilution with water gave an opalescent colloidal dispersion having a particle size less than 0.1 micron. This product was applied to a wool rug as described in Example 1 with similarly good results.

EXAMPLE 8

To 72 parts of an acid colloidal titania monohydrate dispersion prepared as in Example 4 a solution containing 1 part of anhydrous citric acid and 1 part of water was added with stirring. This was followed by the addition of a solution containing 2.5 parts of Carbowax 4000 and 2.5 parts of water. Thereafter, a solution containing 4 parts of $Na_2CO_3$ and 17 parts of water was added with stirring. The dispersion was stirred until smooth. The resulting product had a pH of 8.6 and gave an opalescent colloidal dispersion on dilution with water, with a particle size of less than 0.1 micron. This product was applied to a wool rug as described in Example 1 and showed similarly good soil resistance.

EXAMPLE 9

To 72 parts of an acid colloidal titania monohydrate prepared as in Example 4 a solution containing 1 part of anhydrous citric acid and 1 part of water was added with stirring. This was followed by a solution containing 2.5 parts of Carbowax 4000 and 2.5 parts of water. Thereafter, a solution containing 2 parts of KOH and 19 parts of water was added with stirring. The dispersion was stirred until smooth. The resultant product had a pH of 8.3 and gave an opalescent colloidal dispersion on dilution with water, having a particle size of less than 0.1 micron.

EXAMPLE 10

To 72 parts of an acid colloidal titania monohydrate dispersion prepared as in Example 4 a solution containing 1 part of anhydrous citric acid and 1 part of water was added with stirring. This was followed by the addition of a solution containing 2.5 parts of Carbowax 4000 and 2.5 parts of water. Thereafter, a solution containing 1.6 parts of NaOH and 19.4 parts of water was added with stirring. Stirring was continued until the dispersion was smooth. The resultant product had a pH of 9.2 and gave an opalescent colloidal dispersion on dilution with water having a particle size of less than 0.1 micron.

EXAMPLE 11

Example 4 was repeated except that in place of citric acid there was substituted an equal amount of an 85% solution of orthophosphoric acid. The resulting colloidal dispersion had a pH of 7.3 and on dilution with water gave an opalescent colloidal dispersion containing negatively charged titania monohydrate particles having a size of less than 0.1 micron.

EXAMPLE 12

Example 1 was repeated except that in place of the citric acid there was substituted an equal amount of tartaric acid. The resultant colloidal dispersion had a pH of 7.2 and on dilution with water gave an opalescent dispersion containing negatively charged titania monohydrate particles having a size of less than 0.1 micron.

EXAMPLE 13

Example 1 was repeated except that in place of the citric acid solution there was substituted 2 parts of a 50% glycolic acid solution. The resultant product had a pH of 7.3 and on dilution with water gave an opalescent solution of negatively charged titania monohydrate particles having a particle size of less than 0.1 micron.

Carbowax 4000, a polyethylene glycol having a molecular weight of 4000, may be used with the dispersion of the present invention as a softening agent to prevent any harshening of the hand of materials to which the dispersion is applied. Other softening agents may be used in lieu thereof such as Carbowaxes of higher and lower molecular weight.

The particle size of the titania monohydrate in the dispersion should be less than about 0.1 micron and preferably, for commercial operations between about 0.02 and 0.075 micron.

The amount of solids in a hydrous titania dispersion useful for the treatment of textile fibers and fabrics will cover the rather wide range of between about 0.1 and 5% by weight based on the total weight of the aqueous dispersion. It is preferred, however, that the concentration of solids in the dispersion be between about 0.5 and 1.5% by weight. For optimum operability and results the concentration is generally held to about 1% solids by weight.

The amount of dispersion applied for purposes of imparting soil resistance to fabric is an amount sufficient to deposit between 0.25 and 5% solids based on the weight of the fabric. For pile fabric between 0.25 and 3% solids is normally sufficient and between 0.75 and 1.50% based on the weight of the pile is generally recommended as sufficient to impart a good durable soil resistant property thereto.

The textile-treating process of the present invention may be applied to fibers such as wool, silk, cotton, linen and synthetic fibers such as those derived from linear super polyamides, linear polyesters, polyacrylonitrile and the like and fabrics containing these fibers and mixtures thereof.

In practicing the process of the present invention the particle size of the dispersion is so small that when situated on the fibers there is substantially no color change. That is to say, the dispersion particles are so small as to be practically colorless. This is advantageous, inasmuch as the particles impart soil resistant characteristics to the fiber without any whitening of the fabric.

These negatively charged dispersions are stable even in concentrated form and can be stored for long periods of time at room temperature without aggregation or separation, thus making it possible to prepare them well in advance of their use. Another advantage of the dispersion of the present invention resides in the fact that they can be diluted easily without separation or precipitation.

The titanium dioxide monohydrate dispersion is comprised of particles of such minute size that maximum soil resistance can be obtained with a minimum solid take-up. Thus the process can be carried out at a minimum of additional cost and yet produce very desirable results.

The treating agent of hydrous titania may be applied to fibrous materials by any one of a plurality of conventional treating methods such as spraying, padding, immersion, or passing the fabric in contact with a quetch-roll which travels in the treating suspension and carries a film of the treating agent up to and onto the fabric. So-called flat fabrics or soft fabrics which do not contain pile may be immersed in the suspension and then passed through a wringer to give about a 100% wet pick-up based on the weight of the fabric. Pile fabric, on the other hand, may be passed over a roll with pile down in such a manner as to only wet the pile without contacting the back of the fabric. Regardless of the manner in which the dispersion is applied to the fabric, the treated fabric is always dried by some conventional means such as by passing the treated fabric over stenters or through hot flues or in tumble dryers or the like.

In drying fibers or fabrics impregnated with the dispersion of the present invention, temperatures between 80 and 115° C. may be used. Lower temperatures may be used but this necessitates longer periods of drying. Temperatures higher than 115° C. may also be used, but because of the tendency of the fabrics so treated to yellow, higher temperatures should be avoided, particularly when drying white or light-colored fabrics. Drying is normally continued until the treated fabric is dry to the touch.

It is not known exactly how the colloidal titania monohydrate operates to reduce the soiling. Microscopic examination of the fibers fails to indicate the presence of a continuous film on the fibers. A theory which has been set forth which should in no way constitute a limitation on the present invention is that the fibers contain large numbers of irregular crevices or cavities. These cavities function as sites into which soil particles become lodged and are extremely difficult to remove. When a sufficiently large number of these cavities are filled with soil particles, undesirable discoloration can be noted in the fabric of which they constitute a part. It is believed that the particles of the hydrous titania dispersion of the present invention fill these cavities and thus function as a soil barrier, preventing any subsequent impinging soil particles from becoming lodged in the cavities of the fibers.

While the dispersion of the present invention has been disclosed primarily for use as a soil retardant, it should be noted that it may be used to impart slip resistance to fibers and in addition may be used as delustering agents for fibers and fabrics. Furthermore, though the disclosure is directed primarily to the application of the said dispersion to rugs, generally speaking, it is useful to impart soil resistance to other types of fabrics such as draperies, lamp shades and the like.

Reference is made herein to copending cases, Serial Nos. 394,513 and 409,780, filed November 25, 1953, and February 11, 1954, by Richard D. Vartanian entitled Colorless Colloidal Titania Hydrous Oxide and Process and Titania Hydrates and Process for Preparing Same, respectively.

We claim:

1. A process which comprises acidifying a substantially sulfate ion-free aqueous suspension of titania monohydrate to a pH below about 5 with a monobasic inorganic acid, and thereafter reversing the charge on the resulting colloidal particles by changing the pH to a value between about 5 and about 11 with an alkalizing agent containing an alkaline compound of the group consisting of the hydroxides, carbonates, phosphates and borates of alkali metals and a second acid selected from the group consisting of water-soluble aliphatic acids and water-soluble polybasic inorganic acids, the said alkaline compound being employed in stoichiometric excess relative to the second acid and being introduced into the initial titania hydrate suspension no earlier than the second acid, to produce a stable colloidal suspension of negatively charged substantially uniform titania monohydrate particles less than about 0.1 micron in size.

2. A process according to claim 1 in which the pH is changed to a value between about 6.5 and about 9.

3. A process according to claim 1 in which the monobasic inorganic acid is hydrochloric acid, the alkaline compound is NaOH and the second acid is tartaric acid.

4. A stable colloidal suspension of negatively charged substantially uniform titania monohydrate particles less than about 0.1 micron in size, dispersed in an aqueous medium with a pH between about 5 and about 11 and containing a monobasic inorganic acid, a second acid of the group consisting of water-soluble aliphatic acids and water-soluble polybasic inorganic acids, and an alkaline compound of the group consisting of the hydroxides, carbonates, phosphates, and borates of alkali metals in sufficient stoichiometric excess to produce said pH value.

5. A composition according to claim 4 with a pH between about 6.5 and about 9.

6. A composition according to claim 4 in which the second acid is a polybasic aliphatic acid.

7. A composition according to claim 4 in which the monobasic inorganic acid is nitric acid, the second acid is citric acid and the alkaline compound is sodium carbonate.

8. A composition according to claim 4 in which the monobasic inorganic acid is hydrochloric acid, the second acid is tartaric acid and the alkaline compound is NaOH.

References Cited in the file of this patent

UNITED STATES PATENTS

| | | |
|---|---|---|
| 1,980,429 | Parkinson | Nov. 13, 1934 |
| 2,357,101 | Geddes | Aug. 29, 1944 |
| 2,448,683 | Peterson | Sept. 7, 1948 |
| 2,534,318 | Swanson | Dec. 19, 1950 |
| 2,622,307 | Cogovan | Dec. 23, 1952 |

UNITED STATES PATENT OFFICE
CERTIFICATE OF CORRECTION

Patent No. 2,819,177 January 7, 1958

Robert C. Conn et al.

It is hereby cerified that error appears in the printed specification of the above numbered patent requiring correction and that the said Letters Patent should read as corrected below.

Column 1, line 19, after the word "impart" insert --other--.

Signed and sealed this 18th day of February 1958.

(SEAL)
Attest:
KARL H. AXLINE
Attesting Officer

ROBERT C. WATSON
Commissioner of Patents